United States Patent [19]

Dellecave et al.

[11] 3,772,534

[45] Nov. 13, 1973

[54] LOW POWER, HIGH SPEED, PULSE WIDTH DISCRIMINATOR

[75] Inventors: Thomas L. Dellecave; Rudolf R. Konegen, both of Rome, N.Y.

[73] Assignee: The United States of America as represented by the Secretary of the Air Force

[22] Filed: Apr. 6, 1972

[21] Appl. No.: 241,569

[52] U.S. Cl. .................. 307/234, 307/273, 307/317, 328/112

[51] Int. Cl. .................. H03k 5/20

[58] Field of Search .................. 307/234, 273, 317; 328/111, 112

[56] References Cited

UNITED STATES PATENTS

| | | | |
|---|---|---|---|
| 3,122,647 | 2/1964 | Huey | 307/234 X |
| 3,184,606 | 5/1965 | Ovenden et al. | 307/234 X |
| 3,328,602 | 6/1967 | Taylor | 307/234 |
| 3,244,906 | 4/1966 | Goering | 307/273 X |
| 3,500,370 | 3/1970 | Rasiel et al. | 307/273 X |

OTHER PUBLICATIONS

"Multivibrators Separate Pulse According To Their Widths", in Electronics by Pataki, dated Dec. 8, 1969, page 88.

"Nonsaturating TTL Gate" by Davidson in IBM Tech. Disclosure Bulletin, Vol. 13, No. 9, Feb. 1971, page 2657.

"Exclusive-OR with PNP Amplifier" by Hansen in IBM Tech. Disclosure Bulletin Vol. 14, No. 4, Sept. 1971, page 1102.

*Primary Examiner*—Stanley D. Miller, Jr.
*Attorney*—Harry A. Herbert, Jr. et al.

[57] ABSTRACT

A pulse width discriminator which compares a received pulse with a reference pulse of specified width and produces an output pulse whenever the received pulse width is less than the width of the reference pulse. The reference pulse is generated by a monostable circuit triggered by the leading edge of the received pulse. The received pulse and the reference pulse are applied to two inputs of a logic gate circuit which produces the output pulse. To provide very low standby power requirements for battery operation, the transistor circuits constituting the discriminator are so designed that the transistor currents in the quiescent states of the circuits are practically zero. As part of the low power design, the monostable circuit comprises a complementary arrangement of two transistors both of which are nonconductive in the stable state. Delays in the discriminator are reduced to a minimum by the use of Schottky barrier diodes in shunt to the collector-base junctions of certain transistors.

3 Claims, 2 Drawing Figures

LOW POWER, HIGH SPEED, PULSE WIDTH DISCRIMINATOR

BACKGROUND OF THE INVENTION

Pulse discriminators of the type which compare the width of a received pulse with the width of a reference pulse generated by a monostable circuit and which produce an output whenever the received pulse width differs in one direction or the other from the width of the reference pulse are known in the art, a typical example being the U.S. Pat. to Taylor, No. 3,328,602 issued June 29, 1967. All of these circuits of which applicants have knowledge have an appreciable standby power drain, one of the contributing factors being the full conductivity of one of the two transistors in the usual monostable circuit in the stable state. Where equipment is to be operated from batteries, and in all circumstances where power economy is important, as in spacecraft, it is advantageous that the circuits involved draw power only when actually operating, with standby power requirements a minimum and preferably zero.

SUMMARY OF THE INVENTION

The purpose of the invention is to provide a pulse width discriminator in which the standby power requirement is practically zero and the operating power requirement is directly related to the pulse repetition rate. Briefly, the discriminator comprises a differentiating circuit for deriving a sharp trigger pulse coincident with the leading edge of the received pulse. The trigger pulse initiates one cycle of operation of a monostable circuit comprising a complementary arrangement of a PNP transistor and an NPN transistor in which both transistors are nonconductive in the stable state. In going through one cycle of operation the monostable circuit produces a reference pulse of specified width which, after inversion in an inverter stage, is applied to one of the two input terminals of a logical NAND gate. The received pulse is applied to the other input terminal of the gate circuit which produces an output only when the received pulse width is less than the reference pulse width. In order to achieve the highest accuracy of width discrimination, the inherent delays in the circuit are reduced to a minimum by connecting Schottky barrier diodes in shunt to the collector-base junctions of the transistors in the inverter and monostable circuits.

DETAILED DESCRIPTION

Figure 1:
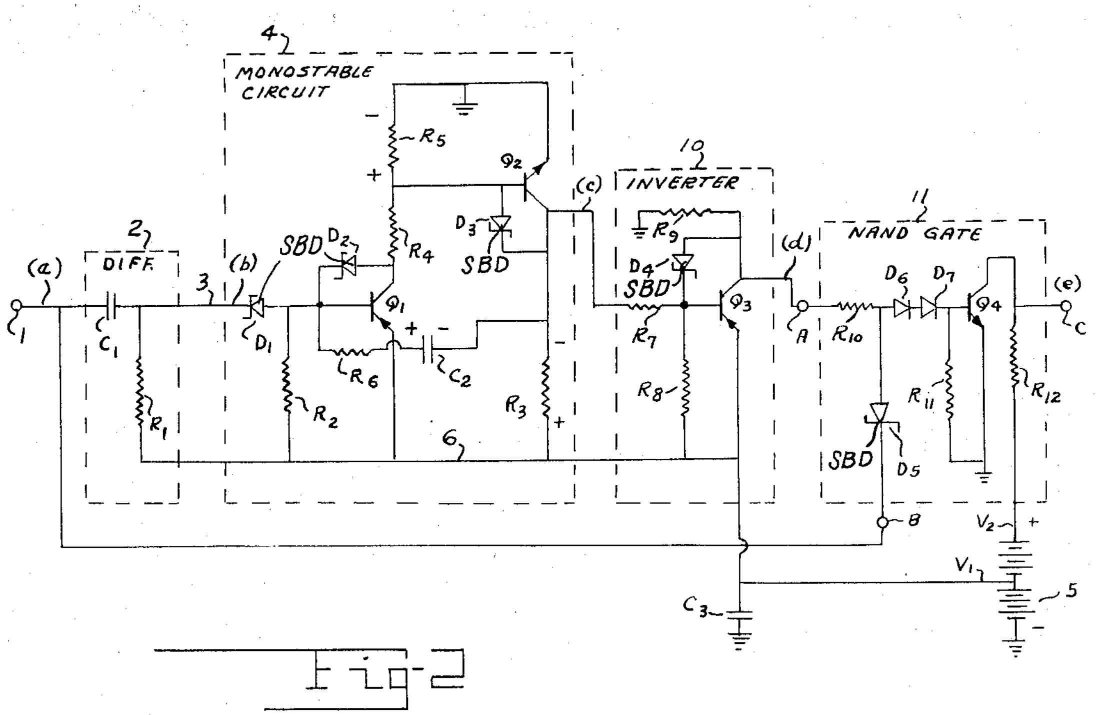
FIG. 1 is a schematic circuit diagram of a pulse width discriminator in accordance with the invention.

Referring to the drawing, the specific discriminator shown in FIG. 1 is designed to receive negative-going pulses as represented by waveform (a) of FIG. 1, at input terminal 1 and to produce negative-going pulses, as represented by waveform (e), at output terminal C whenever the received pulse width is less than the width of a reference pulse represented by waveform (d).

The received pulses at terminal 1 are first applied to differentiating circuit 2 comprising $C_1$ and $R_1$ which produces across $R_1$ and on line 3 sharp negative-going and positive-going pulses corresponding to the leading and trailing edges, respectively, of the applied pulses. Diode $D_1$ blocks the positive-going pulses so that only the negative-going pulses, represented by waveform (b) and corresponding to the leading edges of the input pulses, are applied across $R_2$ to the base of transistor $Q_1$. $D_1$ is a Schottky barrier diode which, as known in the art, is a metal-semiconductor junction having a lower forward direction threshold than an ordinary P-N junction diode.

The pulses represented by waveform (b) serve to trigger monostable circuit 4 at the leading edge of each pulse applied at input terminal 1. At each triggering, the circuit goes through one cycle of operation and in the process generates at the collector of $Q_2$ and across $R_3$ a negative-going pulse of fixed predetermined width, as represented by waveform (c).

Considering the monostable circuit 4 further, PNP transistor $Q_1$ and NPN transistor $Q_2$ are connected as common emitter stages utilized in a complementary switching mode. That portion of the output signal of the $Q_1$ stage developed across $R_5$ is coupled into the base-emitter circuit of $Q_2$ and provides the input to the $Q_2$ stage, the output signal of which is developed across the $Q_2$ collector resistor $R_3$. The polarity of the coupling is such that the signal at the collector of $Q_2$ is in phase with the signal at the base of $Q_1$. Therefore, the feedback circuit comprising $C_2$ and $R_6$ connected between the collector of $Q_2$ and the base of $Q_1$ completes a regenerative loop. Since the emitter-base biases for $Q_1$ and $Q_2$ are zero, in the normal or stable state of circuit 4 the emitter and collector currents are only the leakage currents of the transistors and therefore practically zero. Consequently, the standby load on battery 5 which supplies the monostable circuit is practically zero. Also, in the stable state, the charge in $C_2$ is zero since both the base of $Q_1$ and the collector of $Q_2$ are practically at the potential of conductor 6.

Each of the negative-going trigger pulses of waveform (b) initiates one cycle of operation of the monostable circuit 4. When conduction is initiated in $Q_1$ by the trigger pulse, the above described regenerative feedback causes an instantaneous change in the circuit from the stable state in which both $Q_1$ and $Q_2$ are nonconducting to the unstable state in which both $Q_1$ and $Q_2$ are saturated. This switching action generates at the collector of $Q_2$ the negative-going leading edge 7 of the circuit 4 output pulse represented by waveform (c). Further, the $Q_1$ collector saturation current flowing in $R_5$ produces a potential drop across this resistor of the polarity shown that raises the $Q_2$ base potential above the emitter potential by an amount greater than that required to produce saturation current in the transistor. Similarly, the $Q_2$ collector saturation current flowing through $R_3$ produces a voltage drop thereacross of the polarity shown that, acting through $C_2$ and potential divider $R_6$–$R_2$, lowers the $Q_1$ base potential below the emitter potential by an amount in excess of that required to produce saturation current in $Q_1$. The lowest value of the $Q_1$ base potential occurs immediately after the circuit switches to the unstable state before the $C_2$ voltage has had time to change from the zero value.

While the monostable circuit is in the unstable state, the potential across $R_3$ due to the $Q_2$ collector saturation current causes $C_2$ to charge with the polarity shown. As a result, the $Q_1$ base potential rises exponentially toward the emitter potential at a rate determined by the time constant of the charging circuit. The charging circuit may be traced from the positive end of $R_3$, through the emitter-base junction of $Q_1$ and $R_2$ in parallel, and thence through $R_6$ and $C_2$ to the negative end of $R_3$. For as long as the $Q_1$ base-emitter voltage exceeds the saturation voltage the collector currents of both $Q_1$ and $Q_2$ remain constant at saturation and therefore the $Q_2$ collector voltage remains constant, as illustrated by portion 8 of waveform (c). Eventually the $Q_1$ base voltage reaches the point at which the base-emitter voltage is just sufficient to sustain the collector saturation current. As the base potential rises above this point, the $Q_1$ collector current starts to fall reducing the voltage drop across $R_5$ and the $Q_2$ base-emitter voltage. This process continues until the $Q_2$ base-emitter voltage has been reduced to a value just sufficient to sustain the collector saturation current of this transistor. At this point the $Q_2$ collector current in $R_3$ starts to fall. This raises the collector voltage and, because of the regenerative feedback from the $Q_2$ collector to the $Q_1$ base, initiates an instantaneous switching of the circuit back to the stable state in which both transistors are nonconducting. This switching action generates at the $Q_2$ collector the positive-going edge 9 of the circuit 4 output pulse as seen in waveform (c), thus completing the generation of the reference pulse. Immediately after the circuit has switched back to its nonconducting stable state the $C_2$ voltage has its maximum value and, since the voltage drop across $R_3$ is now zero, the $C_2$ voltage causes the base of $Q_1$ to be positive relative to the emitter. This merely drives $Q_1$ further into cutoff and does not affect the output voltage at the $Q_2$ collector. $C_2$ now discharges through $R_6$, $R_2$, and $R_3$ back to zero voltage, which completely restores the monostable circuit to the standby condition that existed when the trigger pulse was applied.

As is apparent from the above description of the operation of the monostable circuit, the duration or width of the reference pulse at the $Q_2$ collector is determined by the time constant of the $C_2$ charging circuit. By proper selection of the circuit parameters, particularly the values of $R_6$ and $C_2$, this width may be set to the value specified for the pulse width discriminator.

The waveform (c) at the collector of $Q_2$ is inverted to produce waveform (d) of the same pulse duration by the inverter stage 10. This stage comprises a PNP transistor $Q_3$ into the base-emitter circuit of which the output of circuit 4 is coupled by means of $R_7$ and $R_8$. The inverted output appears at the collector and is applied to input terminal A of NAND gate 11. There is no base-emitter bias for $Q_3$ so that in the absence of a signal from circuit 4 only the transistor leakage currents flow and the standby power drain on battery 5 is practically zero.

Conventional DTL NAND gate design requires an extra diode and pullup resistor. With the elimination of these components, the modified NAND gate design shown dissipates power in the microwatt region. The output of inverter 10, illustrated by waveform (d), is applied through gate input terminal A and $R_{10}$ to the anode of $D_6$. The second input to the gate, which is the pulse signal appearing at discriminator input terminal 1 and represented by waveform (a), is applied to input terminal 1 and represented by waveform (a), is applied to input terminal B and thence through Schottky barrier diode $D_5$ to the anode of $D_6$. The parameters of the gate circuit are so selected that the input signal at both terminal A and terminal B must be high to produce conduction in $D_6$ and $D_7$ and, as a result, a collector current in $Q_4$. The truth table for the gate is as follows, 1 representing the high level of waveform (a), (d), and (e) and 0 representing the low levels:

| INPUT A | INPUT B | OUTPUT C |
|---|---|---|
| 0 | 0 | 1 |
| 0 | 1 | 1 |
| 1 | 0 | 1 |
| 1 | 1 | 0 |

Figure 2:
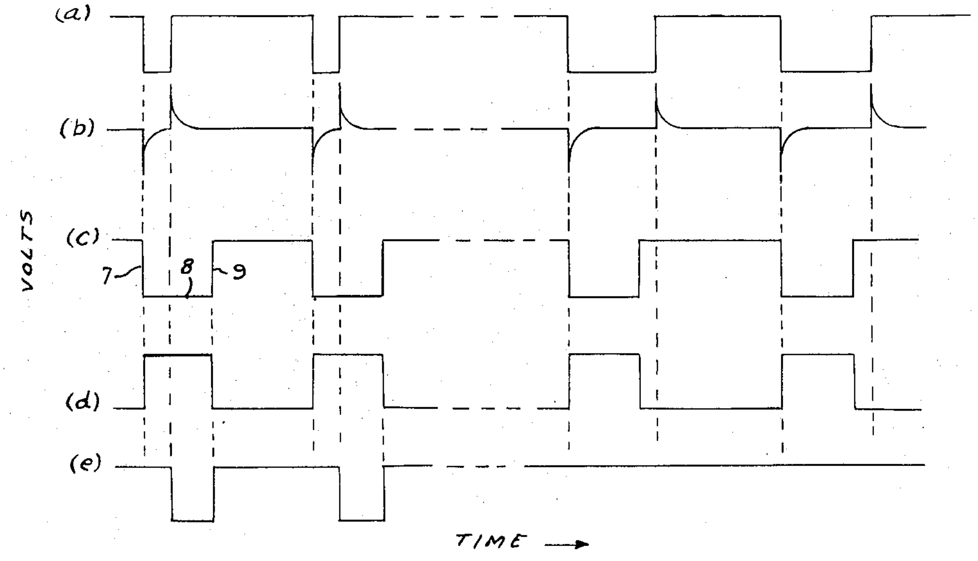
FIG. 2 shows waveforms occurring in the circuit of FIG. 1.

As may be seen in FIG. 2, both inputs A and B will be high only when the received pulses, waveform (a), are of less duration than the duration of the reference pulses, waveform (d). Therefore, as shown by waveform (e), an output is produced at terminal C only when the width of the received pulses is less than a specified width defined by the reference pulse. The width of the negative-going output pulse equals the difference between the received pulse width and the reference pulse width.

The delays inherent in transistors are reduced to a minimum by the use of Schottky barrier diodes $D_2$, $D_3$, and $D_4$ in shunt to the collector-base junctions of transistors. Quicker response is obtained because of the lower forward direction threshold of this type of diode as compared to the threshold of the P-N or N-P collector-base junction of the transistor. The anode of the diode is connected to the P terminal of the transistor.

The specifications of an embodiment of FIG. 1 that was constructed and tested were:

| | |
|---|---|
| $C_1$: 25 pfd | $R_9$: 220 ohms |
| $C_2$: 33 pfd | $R_{10}$: 6.6K ohms |
| $C_3$: 0.2 mfd | $Q_1$,$Q_3$: 2N3546 |
| $R_1$,$R_2$,$R_6$: 1k ohms | $Q_2$,$Q_4$: 2N2369A |
| $R_3$: 110 ohms | $D_{1\text{-}5}$: HP5082-2800 |
| $R_4$,$R_5$: 680 ohms | $D_6$,$D_7$: IN4153 |
| $R_7$: 4.7k ohms | $V_1$:6 volts |
| $R_8$,$R_{11}$: 6.2K ohms | $V_2$: 12 volts |

With these specifications the monostable circuit produced a reference pulse, waveforms (c) and (d), of 150 ns. Tests of the circuit showed a satisfactory output pulse produced for input pulse widths down to 10 ns. In the absence of pulses the circuit showed practically no current drain from the battery. During operation the current drain was directly related to the input pulse repetition rate in the following manner:

| AVERAGE D.C.CURRENT ($\mu$a) | REPETITION RATE (Hz) |
|---|---|
| 1.7 | 100 |
| 3.0 | 200 |
| 7.4 | 500 |
| 14.0 | 1k |
| 29.3 | 2K |
| 44.0 | 3K |
| 59.0 | 4K |
| 73.0 | 5K |

The discriminator circuit of FIG. 1 may be converted for use with positive-going input pulses, and the production of positive-going output pulses, by replacing the PNP transistors with NPN transistors and vice versa, reversing the polarities of all diodes, and reversing the polarity of $V_1$ and $V_2$.

We claim:

1. A pulse width discriminator for producing an output pulse whenever the width of a substantially rectangular input pulse is less than a specified width comprising: a differentiating circuit to which said input pulses are applied for deriving sharp trigger pulses coincident with the leading edges of said input pulses; a monostable circuit comprising first and second junction transistors having bases of opposite conductivity types, means connecting each transistor in the circuit configuration of a common emitter stage having an output circuit including the collector and emitter of the transistor and an input circuit including the base and emitter of the transistor and constructed to provide zero emitter-base bias, a direct current coupling between the output circuit of said first transistor stage and the input circuit of said second transistor stage, and a direct current blocking regenerative feedback coupling between the output circuit of said second transistor stage and the input circuit of said first transistor stage comprising a capacitor and a resistor connected in series between the collector of said second transistor and the base of said first transistor; means including a diode for applying said trigger pulses to the input circuit of said first transistor stage, said diode being poled to reject pulses of polarity opposite to that of the trigger pulses and the base conductivity type of said first transistor being that for which the trigger pulse produces a forward voltage at the emitter-base junction; an inverter comprising a third junction transistor having a base conductivity type opposite to that of the base of said second transistor, and means connecting said third transistor in the circuit configuration of a common emitter stage having an output circuit including the collector and emitter of the transistor and an input circuit including the base and emitter of the transistor and constructed to provide zero emitter-base bias; a direct current coupling between the input circuit of said third transistor stage and the output circuit of said second transistor stage, said coupling including a direct current connection between the base of said third transistor and the collector of said second transistor; a NAND gate comprising a fourth junction transistor having a base conductivity type opposite to that of the base of said third transistor, means connecting said fourth transistor in the circuit configuration of a common emitter stage having an output circuit including the collector and emitter of the transistor and an input circuit including the base and emitter of the transistor and constructed to provide zero emitter-base bias, gate input terminals A and B, a two-terminal network consisting of two series connected diodes, means directly connecting that terminal of said network to the base of said fourth transistor that provides a common direction of forward current flow for the diodes and the base-emitter junction of the transistor, a resistor connected between the input terminal A and the other terminal of said network, a diode poled oppositely to the diodes of said network connected between the input terminal B and the said other terminal, and a gate output terminal connected to the collector of said fourth transistor; a direct connection between the collector of said third transistor and input terminal A of said NAND gate; and means for applying said input pulses to the input terminal B of said NAND gate, the output terminal of the NAND gate constituting the output terminal of the pulse width discriminator.

2. Apparatus as claimed in claim 1 in which the first and last mentioned diodes are Schottky barrier diodes and, in addition, Schottky barrier diodes connected in shunt to the collector-base junctions of said first, second, and third transistors, the anode of the diode in each case being connected to the P-type transistor electrode.

3. Apparatus as claimed in claim 2 in which the input and output pulses of the pulse width discriminator are negative-going pulses, in which the said first and third transistors are PNP transistors, and in which the said second and fourth transistors are NPN transistors.

* * * * *